United States Patent
Peck et al.

(10) Patent No.: US 12,220,733 B2
(45) Date of Patent: Feb. 11, 2025

(54) METHOD FOR NON-CONTACT CLEANING OF FIBER OPTIC CONNECTORS AND END FACES

(71) Applicant: Zynon Technologies, LLC, New Britain, CT (US)

(72) Inventors: Emily J. Peck, Marlborough, CT (US); Samuel Lindeyer, Hartford, CT (US); John T. Doty, Manchester, CT (US); Richard M. Hoffman, Naples, FL (US); Jay S. Tourigny, Canton, CT (US)

(73) Assignee: ZYNON TECHNOLOGIES, LLC, New Britain, CT (US)

( * ) Notice: Subject to any disclaimer, the term of this patent is extended or adjusted under 35 U.S.C. 154(b) by 0 days.

(21) Appl. No.: 18/552,601

(22) PCT Filed: Apr. 5, 2022

(86) PCT No.: PCT/US2022/023382
§ 371 (c)(1),
(2) Date: Sep. 26, 2023

(87) PCT Pub. No.: WO2022/216640
PCT Pub. Date: Oct. 13, 2022

(65) Prior Publication Data
US 2024/0157409 A1    May 16, 2024

Related U.S. Application Data

(60) Provisional application No. 63/170,821, filed on Apr. 5, 2021.

(51) Int. Cl.
*B08B 5/02* (2006.01)
*B08B 3/02* (2006.01)
*G02B 6/38* (2006.01)

(52) U.S. Cl.
CPC .............. *B08B 5/02* (2013.01); *B08B 3/02* (2013.01); *G02B 6/3866* (2013.01); *B08B 2205/005* (2013.01); *B08B 2240/02* (2013.01)

(58) Field of Classification Search
CPC ....... B08B 5/02; B08B 3/02; B08B 2205/005; B08B 2240/02; G02B 6/3866
See application file for complete search history.

(56) References Cited

U.S. PATENT DOCUMENTS

| | | | |
|---|---|---|---|
| 4,004,733 A | 1/1977 | Law | |
| 4,273,287 A | 6/1981 | Huber | |
| (Continued) | | | |

FOREIGN PATENT DOCUMENTS

| | | | | |
|---|---|---|---|---|
| WO | WO-2004010189 A1 * | 1/2004 | ............. | B08B 11/02 |
| WO | 2008072822 A1 | 6/2008 | | |
| WO | 2020005640 A1 | 1/2020 | | |

OTHER PUBLICATIONS

ABC's of Spray Finishing, Binks, DeVilbiss and Ransburg, 1-239-D, Aug. 10, 2012, 44 pages.

(Continued)

*Primary Examiner* — Alexander Markoff
(74) *Attorney, Agent, or Firm* — CANTOR COLBURN LLP

(57) ABSTRACT

A cleaning device (100) for cleaning fiber optic end faces comprises a dispensing nozzle (104) configured to discharge a jet column (118) generated by the Coanda effect with intermittent injection of a cleaning solvent into the jet column (118). The method comprises impinging the jet column (118) onto a fiber optic end face (120) while maintaining a stand-off distance from the end face being cleaned.

8 Claims, 10 Drawing Sheets

(56) References Cited

U.S. PATENT DOCUMENTS

| | | |
|---|---|---|
| 6,776,360 B2 | 8/2004 | Haruch et al. |
| 6,821,025 B2 | 11/2004 | Gerhard |
| 7,028,867 B2 | 4/2006 | Acum et al. |
| 7,147,490 B2 | 12/2006 | Gerhard |
| 7,215,864 B1 | 5/2007 | Qian et al. |
| 7,232,262 B2 | 6/2007 | Lytle et al. |
| 7,401,374 B2 | 7/2008 | Tourigny |
| 7,566,176 B2 | 7/2009 | Lytle et al. |
| 8,087,118 B2 | 1/2012 | Fujiwara |
| 8,402,587 B2 | 3/2013 | Sugita et al. |
| 9,798,093 B2 | 10/2017 | Tourigny |
| 2001/0033728 A1 | 10/2001 | Miyake et al. |
| 2004/0013370 A1* | 1/2004 | Gerhard .................... B08B 3/02 385/85 |
| 2004/0088813 A1 | 5/2004 | Cox |
| 2007/0164130 A1 | 7/2007 | Jackson |
| 2007/0243008 A1 | 10/2007 | Vogt |
| 2016/0170153 A1 | 6/2016 | Forrest, Jr. |
| 2017/0351039 A1 | 12/2017 | Nakane et al. |
| 2018/0128993 A1 | 5/2018 | Brown et al. |
| 2018/0259720 A1* | 9/2018 | Brown .................... B08B 3/02 |
| 2020/0070211 A1 | 3/2020 | Brown et al. |
| 2021/0101167 A1 | 4/2021 | Hill et al. |

OTHER PUBLICATIONS

International Preliminary Report on Patentability for International Application No. PCT/US22/23382; International Filing Date Apr. 5, 2022; Date of Mailing Oct. 3, 2023; 12 pages.

International Search Report for International Application No. PCT/US22/23382; International Filing Date Apr. 5, 2022; Date of Mailing Jul. 6, 2022; 2 pages.

Written Opinion for International Application No. PCT/US22/23382; International Filing Date Apr. 5, 2022; Date of Mailing Jul. 6, 2022; 4 pages.

\* cited by examiner

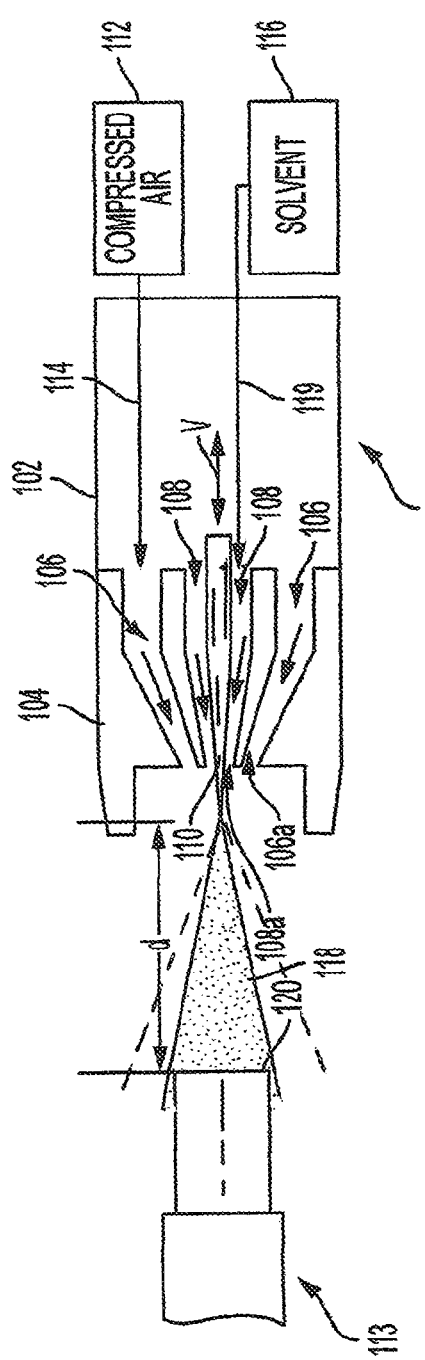
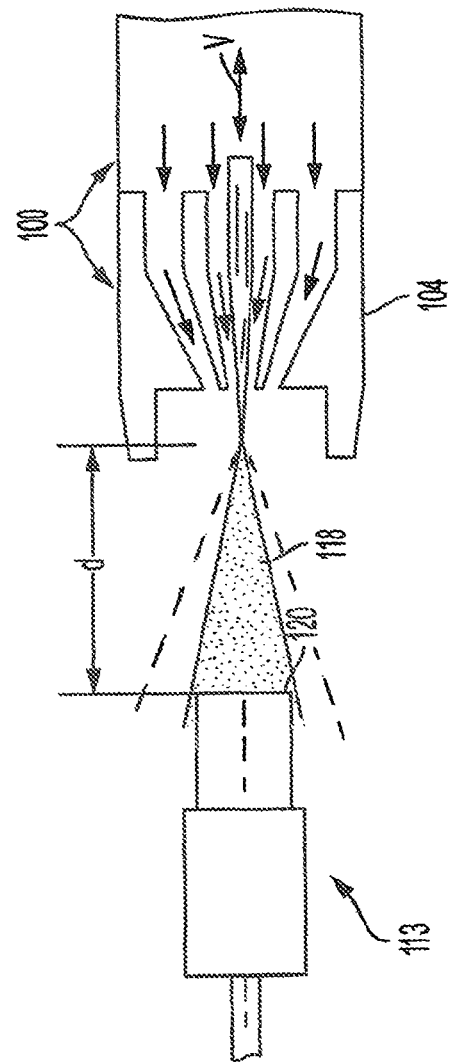
FIG. 8
FIG. 9

METHOD FOR NON-CONTACT CLEANING OF FIBER OPTIC CONNECTORS AND END FACES

CROSS-REFERENCE TO RELATED APPLICATIONS

This application is a U.S. national stage application of International Application No. PCT/US2022/023382, which has an international filing date of 5 Apr. 2022, and which claims priority of provisional patent application Ser. No. 63/170,821 filed on Apr. 5, 2021 in the name of Emily J. Peck et al., and entitled "DEVICE AND METHOD FOR NON-CONTACT CLEANING OF FIBER OPTIC CONNECTORS AND END FACES".

BACKGROUND OF THE INVENTION

1. Field of the Invention

The present invention generally relates to a method of utilizing non-contact cleaning devices for cleaning the ferrule end surfaces of optical fibers. The ferrule end surfaces may be efficiently cleaned whether they are exposed or installed in a ferrule connector such as a plug or a bulkhead for interconnection with another optical fiber or with an optoelectronic device.

Figure 1A:
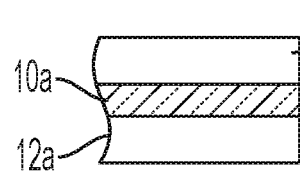
Figure 1B:
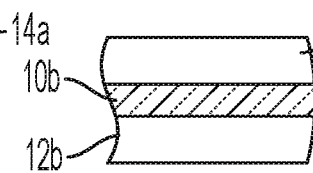
Figure 1C:
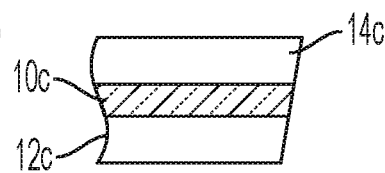
Figure 2:
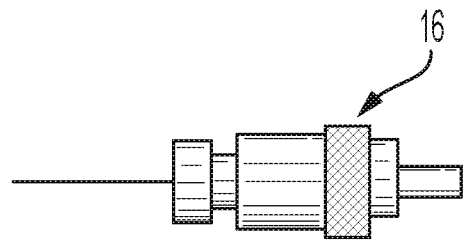
Figure 3:
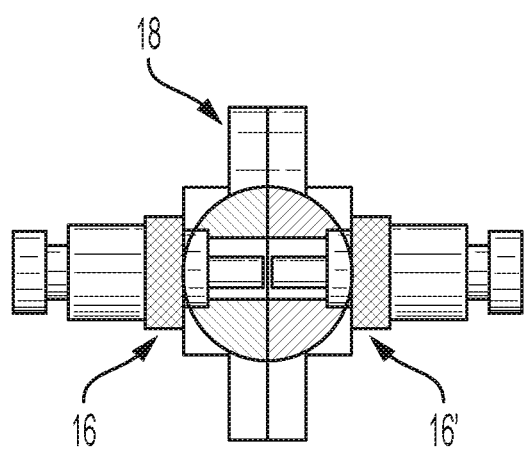

In fiber optic networks, optical fiber strands, which typically have a diameter of about 8 micrometers, are connected by encasing the strands in protective jackets (not shown) to form cables and butting two cable ends together. To do this, the ends of the individual fiber optic strands 10a, 10b, 10c (FIGS. 1A, 1B, 1C) are typically stripped of the jacket and are bonded and encased in the center of a rod-like ceramic ferrule 12a, 12b, 12c. This ferrule provides an enlarged surface area for finish polishing of the exposed end face of the optical fiber strand. The ferrule end faces 14a, 14b, 14c are polished either flat (FIG. 1A), slightly convex (FIG. 1B), or angled at approximately 8 degrees (FIG. 1C) to reduce reflected light when connected to another optical fiber. These ferrules are then fitted into various types of connector housings, e.g., connector 16 (FIG. 2), which precisely interconnect with similar devices, e.g., connector 16' (FIG. 3), via a coupler or bulkhead 18 to insure the exact alignment of the butted optical fiber strands. For cleaning, the assembly of FIG. 3 is disassembled to expose the ferrule end face for cleaning while it is still connected to its associated half of coupler or bulkhead 18.

Figure 4:
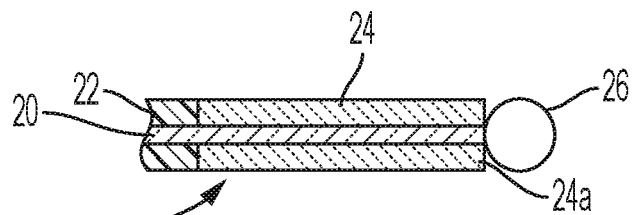

FIG. 4 shows the end of a fiber optic cable 19 comprising a fiber optic strand 20 having an outer protective jacket or sheath 22, the end portion of which is stripped away with the stripped portion of strand 20 encased in a ferrule 24 having an end face 24a. Ferrule 24 has affixed to its end face 24a a lens 26 which may be of spherical or approximately spherical configuration to render ferrule 24 an expanded beam ("EB") ferrule. Lens 26 is usually a collimating lens although it may be an imaging lens. In any case, lens 26 is disposed in optical-transmitting relation to the end of its associated fiber optic strand 20.

Figure 5:
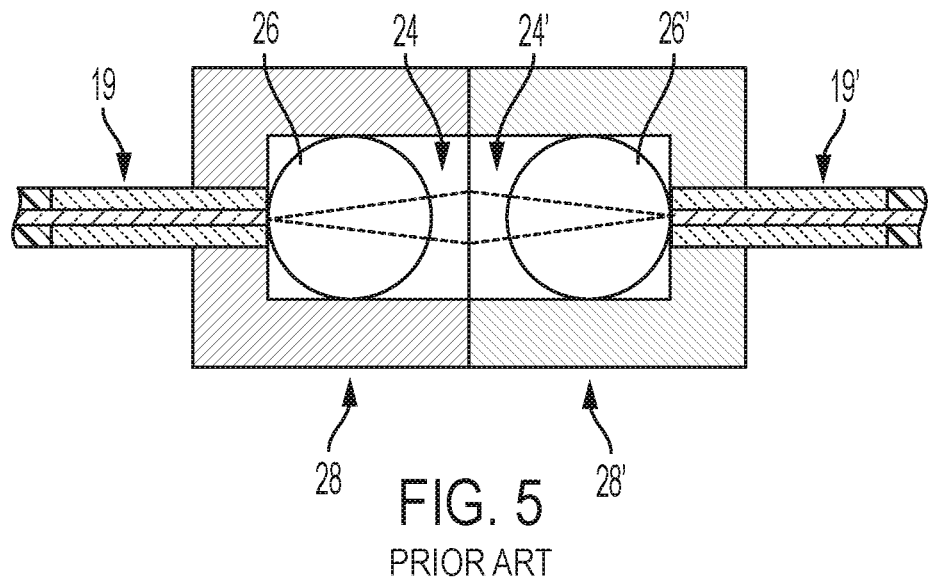

FIG. 5 shows a pair of optic fiber cables 19, 19', each having respective EB ferrules 24, 24', whose respective lenses 26, 26' are optically connected to each other by connectors 28, 28'. Connectors 28, 28' may be connected to each other by any suitable means, such as mechanical fasteners or couplers. Connectors 28 and 28' are each configured to be uncoupled from each other in order to permit inspection and cleaning of the disconnected ferrule end faces 24, 24a' and their associated lenses 26, 26'.

Figure 6:
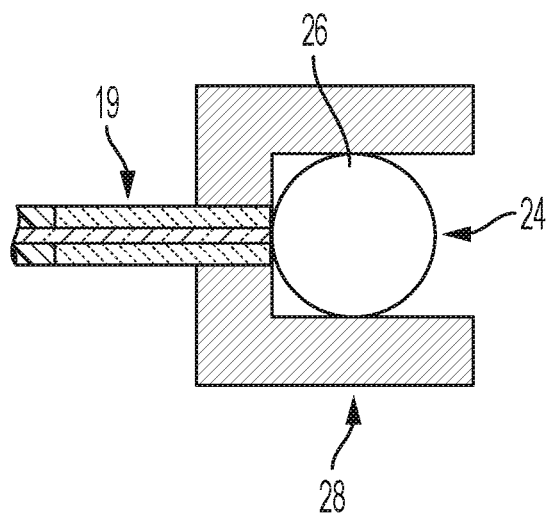

FIG. 6 shows one of the connectors, connector 28, of FIG. 5, disconnected from its associated connector 28' and thus ready for cleaning.

Cleanliness of cable connections such as those described above is a critical factor in maintaining peak signal communication performance, but such cable connections are highly susceptible to contamination at the abutting end faces of the optical fibers. Therefore, it is essential that the end surfaces be cleaned before the optical fiber ends are connected to each other, and/or after they become contaminated during normal use.

2. Prior Art

It is known that a conventional artists' air brush, which utilizes a reciprocating tapered needle valve, will generate the Coandă effect discussed below. The Coandă effect is known to play a role in shaping the spray pattern of the air brush.

U.S. Pat. No. 7,232,262 issued Jun. 19, 2007 to S. Lytle et al. ("Lytle") discloses a cleaning apparatus for cleaning an end face of an optical fiber contained in an interface device. The apparatus utilizes a pressurized fluid such as air or nitrogen to deliver a solvent such as a hydrocarbon and terpene mixture by deploying the nozzle tip of the pressurized fluid delivery tube within a solvent delivery tube of larger diameter than the pressurized fluid delivery tube. The Lytle device is inserted into the connector 200. See, for example, FIG. 2 and column 9, lines 41-50 and column 9, line 58 to column 10, line 3 of Lytle. At column 11, lines 6-22, the distance from the discharge port, i.e., nozzle tip 114, from the fiber optic end face 202 (FIG. 2) is preferably approximately 0.02 to 0.20 inch, e.g., 0.05 inch, although Lytle states that "other distances are appropriate for use with the present invention." Starting at line 15 of column 11, Lytle notes that if the nozzle tip is too close to the fiber optic end face, increased back pressure decreases the effectiveness of cleaning, whereas if the nozzle tip is too far from the fiber optic end face, the energy of the gas/solvent jet is dissipated, thereby reducing cleaning effectiveness.

U.S. Pat. No. 6,821,025 issued Nov. 23, 2004 to G. J. Gerhard ("Gerhard") discloses in FIG. 2 a device including a pressurized gas/cleaning solvent discharge port or nozzle 114 spaced from the fiber optic end face 202 in a manner similar to that described in Lytle. The arrangement is contained in a cleaning assembly 100 (FIG. 1 and column 5, lines 23 et seq. of Gerhard) designed to be inserted into female inputs 204 and 206 of a bulkhead adapter which holds fiber optic connectors 214 and 216. FIG. 4 of Gerhard shows an alternate embodiment in which the cleaning solvent/pressurized gas delivery system is disposed at an angle to fiber optic end face 402 and comprises an evacuation tube 304 and a microscope 500. See the description at column 10, line 26 et seq.

The Lytle and Gerhard patents disclose cleaning of fiber optic end faces without physical contact with the fiber optic end face, but do require insertion of a nozzle arrangement into the connector or other structure associated with the fiber optic connector. Other patents disclose contact cleaning in which a swab or cloth is physically contacted with the end face. For example, U.S. Pat. No. 7,401,374 issued on Jul. 22, 2008 to J. S. Tourigny and U.S. Pat. No. 9,798,093 issued on Oct. 24, 2017 to J. S. Tourigny, both assigned to the assignee of this application, disclose manually operated swab-like cleaning devices for cleaning optical fiber end faces disposed within connector couplers or bulkhead receptacles. U.S. Pat. No. 9,798,093 discloses a cleaning swab adapted to clean expanded beam optical fibers. U.S. Pat. No. 8,087,118 issued on Jan. 3, 2012 to K. Fujiwara, discloses a contact cleaning tool of the type sometimes referred to as a "clicker". A cleaning tool 1 (FIG. 1) utilizes a "cleaning body", i.e., a strip of cleaning cloth, which is dispensed from a supply reel 30 over a head member 23 then to a take-up reel 31. Head member 23 is inserted into a connector insertion port 71 of an optical adapter 70 (see column 13, lines 1-6 and FIGS. 7-9) and the cleaning head is rotated to clean the optic fiber end face by direct contact with the cleaning body (cloth strip), which is advanced as necessary to provide fresh cleaning cloth. Advancing the cleaning cloth in such devices is accomplished mechanically and results in a clicking sound, hence the reference to this type of device as a "clicker".

Numerous patent publications deal with devices and methods for cleaning fiber optic end faces. The following are a few examples. U.S. Pat. No. 7,147,490 issued Dec. 12, 2006 to G. J. Gerhard ("Gerhard II") discloses a fiber optic end face cleaning apparatus which is designed to enter the housing of an interface device and supplies compressed air and solvent for cleaning, as well as a vacuum line to remove residual solvent. Gerhard II discusses the problem of residual solvent trapped in a chamfer or other crevice in the housing flowing back onto, and contaminating the just-cleaned end face. The vacuum applied at the end of the cleaning cycle may not be able to draw residual solvent out of such crevices and so Gerhard II provides additional structure, a retractable baffle, to try to prevent solvent from entering such crevices in the first place. For example, see column 12, line 48 to column 13, line 2 of Gerhard II.

U.S. Patent Publication 2021/0101167 A1 published Apr. 8, 2021 to K. M. Hill et al. discloses a compressed-gas can system for cleaning fiber optic end faces including an interfacing tube 250 (FIG. 2) which must be inserted into the housing of the optic fiber. U.S. Pat. No. 7,566,176 issued Jul. 28, 2009 to S. Lytle et al. shows a similar arrangement.

The following patent publications disclose spray devices generally. U.S. Pat. No. 6,776,360 issued Aug. 17, 2004 to J. Haruch et al. discloses a gun-like spray device including a reciprocating movable valve needle to control the spray, as described, for example, at column 3, lines 52-67. Patent Publication US 2007/0164130 A1 published on Jul. 19, 2007 ("Jackson") discusses utilizing the Coandă effect in composite spray devices to transfer a lubricant on the external surface of the device for turbulent mixing with a propellant fluid, e.g., compressed air, at the nozzle outlet. See, for example, paragraphs [0008] and [0030], and FIG. 2 of Jackson.

SUMMARY OF THE INVENTION

The present invention makes use of a phenomenon known as the Coandă effect to create a precise flow of pressurized air (or other suitable gas) and atomized solvent which follows the alignment surface and surrounding areas of a fiber optic end face to clean and dry the alignment surface and surrounding area. The Coandă effect is a known phenomenon and occurs when a free jet of a fluid emerges close to a surface: the jet tends to "attach" itself to, and flow along, the surface as more fully described below. In contrast to prior art cleaning devices and methods, the present invention enables non-contact cleaning of fiber optic end faces whether they are contained within the recesses of an adapter, or exposed, that is, not enclosed within an adapter. The non-contact cleaning is attained by spacing the nozzle outlet of the cleaning device a particular distance from the end face being cleaned as described below, and without introducing any part of the cleaning device into the recess of an adapter. This is attained by utilizing the Coandă effect to have both a jet of a gas, for example, air, with entrained atomized solvent and then only a drying jet of air be directed onto connector end face surfaces to be cleaned. The cleaning device and method of the present invention are particularly useful for non-contact cleaning of fiber optic ferrule end faces used to mate optical fibers where a connect/disconnect capability is required.

The cleaning device of the present invention comprises a housing having a dispensing nozzle adapted to deliver a narrow jet or column of pressurized gas and atomizes a solvent within the narrow column of pressurized gas, e.g., air, carbon dioxide, nitrogen or other suitable gas. The housing is positioned to selectively direct both the narrow column of pressurized gas, and the narrow column of pressurized gas and atomized solvent, onto a fiber optic end face or expanded beam lens to remove contaminants on the end face, whether or not the end face is contained within an adapter. A method for cleaning an end face of an optical fiber comprises the steps of using low pressure areas developed by use of the Coandă effect to establish and direct a narrow column of pressurized gas dispensed from the nozzle toward and into contact with the end face. The method also comprises injecting a solvent into the pressurized gas by means of the low-pressure areas established in the gas column by the Coandă effect. The low-pressure areas atomize the solvent into droplets that mix with the pressurized gas in a narrow column to provide non-contact cleaning of fiber end faces. The method of the present invention further comprises using the Coandă effect to deliver a column of pressurized gas, e.g., air, to dry the end face after the solvent flow is discontinued.

In accordance with the present invention use is made of an apparatus comprising a needle-valve nozzle configured to induce the Coandă effect in a jet or column of pressurized gas and to selectively mix atomized liquid solvent with the column of pressurized gas.

While any suitable solvent composition may be employed in the practice of the present invention the inventors have developed some specific solvent formulations which are particularly useful in the practice of the present invention. Unless otherwise specifically indicated, the amount of components of solvent formulations disclosed herein is given in weight percent ("wt %") of the components and means the weight of the component as a percentage of the total weight of the composition.

Specifically, in accordance with one aspect of the present invention there is provided a method of cleaning an end face of an optical fiber with a cleaning device comprising a nozzle having a nozzle outlet, within which nozzle outlet is disposed a needle plug of diminishing cross section in the direction of outward flow through the nozzle outlet. The needle plug terminates in a pointed tip facing outwardly of the nozzle. The method comprises the following steps. Flowing a compressed gas through the nozzle over the needle plug and through the nozzle outlet, the needle plug and nozzle outlet being configured to form an emitted gas jet exiting from the nozzle outlet, the emitted gas jet forming a zone of reduced pressure relative to ambient atmospheric pressure, the zone of reduced pressure surrounding the emitted jet. Aligning the nozzle outlet with such end face and positioning the pointed tip of the needle plug from about 0.25 inch to about 0.75 inch (0.64 to 1.91 cm) from such end face. Introducing a liquid solvent upstream of the nozzle outlet into the compressed gas, whereby the solvent is atomized in the emitted gas jet. Impinging the emitted gas jet containing atomized solvent onto such end face for a cleaning time period. Then discontinuing introduction of the solvent into the compressed gas and impinging the resulting dry gas jet onto such end face for a drying time period to remove solvent by evaporation which is accelerated by the zone of reduced pressure, without imposing a vacuum on or adjacent to such end face.

Other aspects of the present invention comprise one or more of the following, alone or in any suitable combination. The cleaning time period may be from about 0.5 to about 2 seconds and the drying time period may be from about 1 to about 4 seconds; the liquid solvent may have a vapor pressure at 25° C. and one atmosphere pressure of from about 20 to about 25 kPa, a Kauri Butanol value of from about 18 to about 44, and is non-flammable per ASTM D-56 Closed Cup Flash Point test; the liquid solvent introduced into the gas jet may comprise (a) 83 wt % hydrofluoroethers comprising 55 to 90 wt % methyl nonafluoroisobutyl ether and 10-45 wt % methyl nonafluorobutyl ether, (b) 10 wt % hydrofluoroethers comprising 90 wt % Z-isomer and 10 wt % E-isomer, and (c) 7 wt % heptane, and the solvent may contain less than 10 ppm non-volatile residue and less than 100 ppm moisture.

In another aspect of the present invention, the liquid solvent introduced into the gas jet may comprise 60 wt % 1,1,1,3,3,3-hexafluoro-2-methoxypropane, 34.9 wt % 1-chloro-2,3,3-trifluoroprop-1-ene, 5.0 wt % acetone, 0.10 wt % nitromethane, the solvent containing less than 10 ppm non-volatile residue and less than 100 ppm moisture.

Still another aspect of the present invention provides that the nozzle outlet may comprise a gas outlet and a separate solvent outlet, and the needle plug may be disposed within the solvent outlet, the method further comprising moving the needle plug between an open position which opens the solvent outlet to dispense solvent into the emitted gas jet and a closed position which stops the dispensing of solvent into the emitted gas jet, and moving the needle plug into the open position to initiate the cleaning time period and moving the needle plug into the closed position to terminate the cleaning time period and initiate the drying time period.

Other aspects of the present invention comprise one or more of the following, alone or in any suitable combination. The compressed gas may be selected from the group consisting of air, nitrogen and carbon dioxide; the velocity of the emitted gas jet flowing over the needle plug is sufficient to impart a Coandă effect to generate the zone of reduced pressure.

BRIEF DESCRIPTION OF THE DRAWINGS

FIG. 1A is a cross-sectional view of a ferrule end with the end of an optical fiber therein, with a flat end surface according to the prior art;

FIG. 1B is a cross-sectional view of a ferrule end with the end of an optical fiber therein, with a convex end surface according to the prior art;

FIG. 1C is a cross-sectional view of a ferrule end with the end of an optical fiber therein, with an angled end surface according to the prior art;

FIG. 2 is an elevation view of a connector fitting with a ferrule end therein according to the prior art;

FIG. 3 is a partly cross-sectional view of two ferrule ends with optical fibers therein in a coupling to interconnect the optical fibers according to the prior art;

FIG. 4 is a schematic cross-sectional view of a ferrule end with the end of an optical fiber therein, with an expanded beam end surface according to the prior art;

FIG. 5 is a schematic cross-sectional view of two ferrule ends with expanded beam optical fibers therein in a coupling to interconnect the optical fibers according to the prior art;

FIG. 6 is a schematic cross-sectional rendition of one of the ferrule connectors of FIG. 5;

FIG. 7A is a schematic illustration of ambient air pressure acting on a jet of air or other gas;

FIG. 7B is a schematic illustration of the air jet of FIG. 7A traversing the surface of a curved or bent structure;

FIG. 8 is a schematic cross-sectional view of the nozzle of an embodiment of the present invention;

FIG. 9 is a schematic cross-sectional view of the nozzle of an embodiment of the present invention positioned to clean an exposed optical fiber end face, that is, an optical fiber end face which is not enclosed within a connector;

FIG. 10 is a schematic cross-sectional view corresponding to FIG. 9 but with the nozzle positioned to clean a fiber optic end face which is enclosed within a connector;

FIG. 10A is an elevation view taken along line A-A of FIG. 10; and

FIGS. 11-1 through 11-5B are ink drawings which reproduce photographs of fiber optic end faces enlarged eighty times showing contamination of the end faces before and after cleaning by the method and device of the present invention.

DETAILED DESCRIPTION OF THE INVENTION

In fiber optic networks, single mode glass optical fiber strands which have a diameter of about 8 micrometers, are connected by encasing the strands in protective jackets to form cables and butting two cable ends together. To do this, both terminating ends of the individual fiber optic strands are typically stripped of the jacket and are bonded and encased in the center of a rod-like ferrule. This ferrule provides an enlarged surface area for the finish polishing of the exposed end face of the optical fiber strand. Ferrules are typically made of ceramic, but may also be made of metal, or plastic. The ferrules generally conform to standard sizes with the most common having end faces with diameters of 1.25 millimeters ("mm"), 1.6 mm, 2.0 mm, or 2.5 mm. Because of signal problems related to back reflection, a flat polished end face is now rarely used. To ensure good physical contact of two connectors when mated, the most common end face geometry of a single mode connector is polished in a convex curve. In modern fiber networks the ferrule end faces are polished in either a convex physical contact finish ("PC Finish") in which an end face is polished to a slightly curved convex or spherical shape profile with a minimum and maximum value of curvature defined by Telecordia GR-326 (the most commonly used set of vender neutral technical specifications and standards) as a radius between 7 mm and 22 mm, or less commonly as an angled 8-degree profile (APC finish). Both profiles ensure a desired physical glass on glass contact of fiber strands when two connector end faces are mated. The physical contact reduces light source separation loss due to Fresnel reflection as well as return light reflection at the connection. The ferrules are fitted into various types of connector adapter housings, which incorporate an inner sleeve to precisely interconnect with similar devices, e.g., connector via a coupler or bulkhead to insure the exact alignment of the butted optical fiber strands.

Cleanliness of the cable connections is a critical factor in maintaining peak signal communication performance. Mated connectors are highly susceptible to microscopic amounts of contamination at each of the abutting end faces of the optical fibers. Specifically, the optical transmission capability of the junction between two optical fibers can be significantly impaired by microscopically small deposits of contamination on the polished end surfaces of the fibers. Sources of such microscopic contamination include smoke soot, dust, dirt, moisture and other ambient contaminates including oils, salts and particles transferred by contact with the skin of technicians during connector manufacture and assembly, cable installation, or job site service work. Small amounts of contamination in the form of microscopic particles or a microscopic oil haze will significantly increase light attenuation across the butted connection. As network traffic is increased by use of Wavelength Division Multiplexing (WDM) technology, the need for a clean fiber-optic end face has grown in importance. Also, as demand for signal traffic bandwidth in fiber-optic communication systems increases, the cleanliness at the fiber-optic end face is increasingly important because of increases in the laser power driving fiber-optic signals. When a high-powered laser strikes a microscopically small piece of contamination on a fiber-optic end face, the contamination may burn leaving soot or burn marks on the fiber-optic end face that can significantly degrade signal transfer through the connection.

Therefore, it is essential that connector end surfaces be cleaned before the optical fiber ends are mated to each other, and/or after they become contaminated during normal use.

In a single mode fiber, the glass core diameter is only 8 microns in diameter and it is impossible to meaningfully inspect in the ferrule end face without magnification. Special microscopes have been engineered to visually inspect the end face and confirm the removal of microscopic contamination prior to mating. Most inspection scopes magnify the end face between 200×-400× with the inspection image displayed on a small video screen. To minimize operator error in determining cleanliness of the fiber optic end face, it is common for inspection scopes to employ software to confirm cleanliness using a Pass/Fail outcome when inspected to an industry standard such as IEC 61300-3-35. Modern scopes may also be capable of maintaining a digital archive of images of cleaned connectors to document the successful cleaning outcome of multitudes of individual connectors.

Pressurized gas/solvent cleaning devices, such as those described above in the description of prior art, which are used for cleaning a fiber end face installed in the recesses of an adapter housing require insertion of the nozzle into the adapter and therefore must be uniquely sized to clean either a 1.25 mm, 1.6 mm, 2.0 mm or 2.50 mm connector. It is not possible to use a prior art cleaner designed for a 2.5 mm connector to clean a 1.25 mm connector and vice versa. As a result, field technicians who are cleaning connectors with prior art cleaners as part of their daily routine must be equipped with various size cleaners engineered to clean a specific size and type connector. Further, the necessary insertion of the nozzles into the adapter requires physical contact which increases the risk of the cleaning device introducing or redistributing oil or dust contamination onto the fiber optic end face.

There currently exist Multimode fiber connectors with a core diameter of either 50 or 60.5 microns, Multi Fiber Push On (MPO) connectors that are ideally suited for simultaneously mating 8, 12, or 24 fibers of a ribbon connector, and a variety of other fiber connector configurations with similar cleaning challenges. Although single mode fiber optic connectors are discussed herein, the Coandă effect cleaning method described herein is well suited to cleaning all types and configurations of fiber connectors and provide the same benefits as described herein for single mode connectors.

Figure 7A:
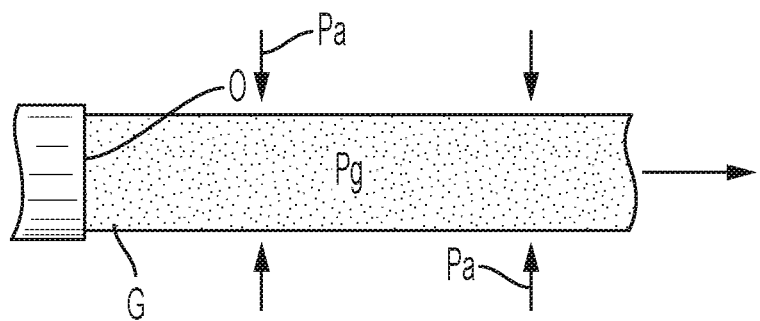
Figure 7B:
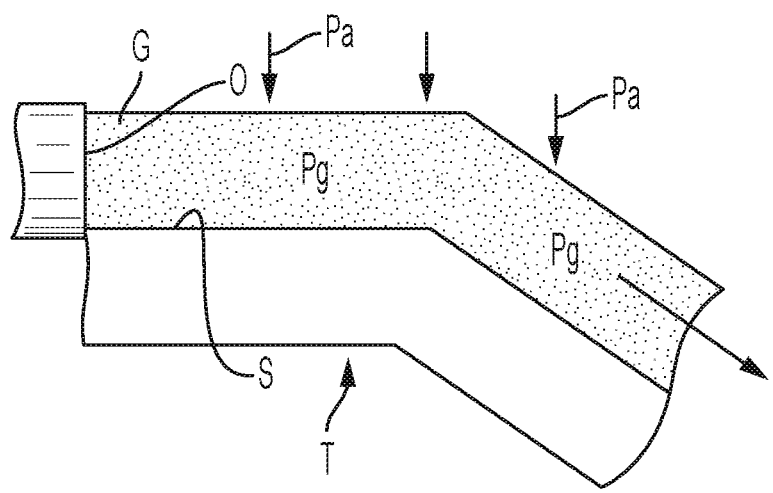

Before discussing specific embodiments of the present invention, an explanation of the Coandă effect is useful. The Coandă effect is named after Henri Coandă, a Romanian engineer and mathematician. Coandă noted the tendency of a jet of fluid emerging from an orifice to follow an adjacent surface, whether a flat or curved surface, and to entrain fluid from the surroundings so that a region of lower pressure develops along the jet of fluid. The Coandă effect may be understood with reference to the well-known Bernoulli principle that a fast moving jet of air has lower pressure than adjacent still or slower-moving air. Aircraft wings are curved on their top surfaces so that the air must travel faster along the top surface of the wing than along the bottom surface of the wing, thereby reducing the pressure acting on the top surface. The resulting higher pressure on the bottom surfaces of the wings generates the "lift" which enables an aircraft to fly. The Coandă effect is explained with reference to FIGS. 7A and 7B. A jet G of air or other gas exiting from an orifice O is moving at a velocity higher than that of the surrounding ambient atmosphere, which may be stationary. The jet G therefore, in accordance with the Bernoulli principle, has a lower pressure $P_g$ than the pressure $P_a$ of the ambient atmosphere. In FIG. 7A, the pressure of the ambient atmosphere, e.g., atmospheric pressure, is indicated by the arrows $P_a$ and is seen to act on the entire outer circumference of the jet G. In contrast, as shown in FIG. 7B, if the jet G is discharged adjacent to a surface S of a structure T, the structure T blocks the ambient air pressure $P_a$ from acting on one side of the jet G, so that the unblocked ambient pressure $P_a$ forces the jet G into contact with surface S. Even if the surface S is curved or bent as shown in FIG. 7B, ambient pressure $P_a$ forces the jet G to follow the contour of the surface S. The Coandă principle is applied in various fields such as air foils (aerodynamics), gas burner flare tips and film blowing. The present invention utilizes the Coandă effect to have cleaning and drying jets of fluid be directed at, adhere to, and follow the contour of ferrule end faces and any surrounding enclosing structure without contact of the cleaning device with the structures to be cleaned. In order to attain Coandăeffect, care must be taken to aim the jets accurately and to distance the nozzle from which the jets emanate a proper distance from the surfaces to be cleaned.

Figure 10:
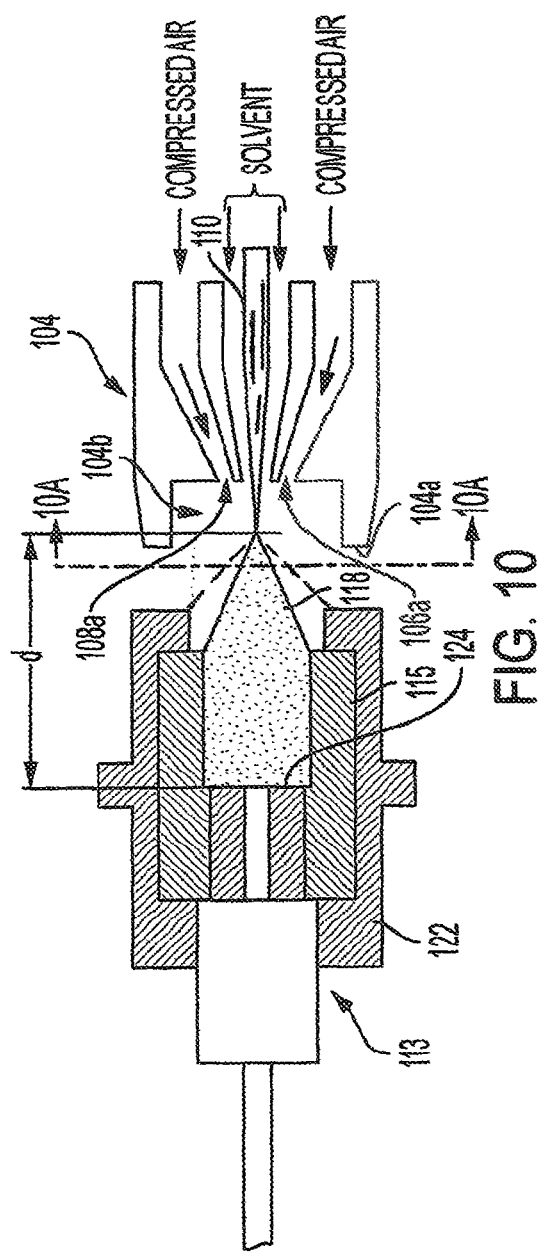

In FIGS. 8, 9 and 10, the usual controls employed to control the flow of gas and solvent and to operate the needle valve are omitted to simplify the drawings. Such controls are well known in the art and in and of themselves form no part of the present invention.

Figure 10A:
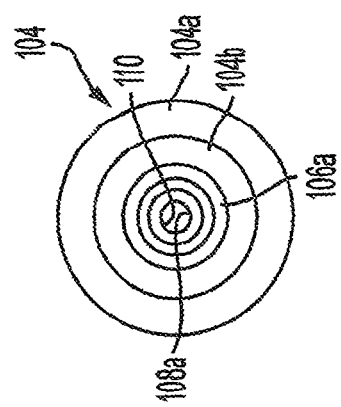

A cleaning device 100 (FIG. 8) in accordance with an embodiment of the present invention comprises a housing 102 having a dispensing nozzle 104 at one end thereof. Dispensing nozzle 104 has two orifices, one orifice 106a at the discharge end of a gas passageway 106 and the other orifice 108a at the discharge end of a solvent passageway 108. Solvent orifice 108a is centered in the nozzle 104 and is closable by means of a centrally positioned, movable, symmetrical shaped needle plug 110 that has a smooth sidewall which is slanted to end in a sharp point at the tip of the needle plug. The needle plug 110 is normally positioned so the solvent orifice 108a is in the closed position (not illustrated). A second outer, gas orifice 106a is in proximity to and concentric with the solvent orifice 108*a*. Orifices 106*a* and 108*a* are each circular in cross section as best seen in FIG. 10A.

Needle plug 110 is disposed at the exit of solvent passage 108 and is movable (leftwardly as viewed in FIGS. 8, 9 and 10) to close solvent passage 108 and (rightwardly as viewed in FIGS. 8, 9 and 10) to open solvent passage 108. This movement of needle plug 110 is indicated by the two-headed arrow V in FIG. 8 and it is seen that the amount of solvent flow is regulated by the position of needle plug 110 and any selected degree of opening between fully open and fully closed.

A stream of dry, filtered, compressed air from a source 112 of compressed air is flowed through line 114, and is passed through the air outer orifice 106*a* and parallel to the slanting sidewalls of needle plug 110. The moving compressed air clings to the slanted shape of the sharp point of needle plug 110 which projects beyond solvent orifice 108*a*, which provides the Coandă effect, resulting in an area of low pressure that originates at the sharp point of the needle plug 110 and is indicated in FIGS. 8, 9 and 10 by the unnumbered dash lines bordering jet column 118. The low pressure zone surrounds the jet column 118 and is somewhat trumpet shaped. The low pressure causes a concentration of airstream velocity and manipulates the airstream shape into a narrow jet column 118 that remains highly concentrated at a distance d which is between 0.25 inch and 0.75 inch, that is, between 0.635 centimeters ("cm") and 1.905 cm, from the sharp tip of needle plug 110. This allows the concentrated jet column 118 to be focused onto an exposed fiber end face for cleaning without the need of physical contact such as rubbing the end face with a cleaning cloth. FIG. 9 shows the jet column 118 surrounded by the low pressure zone impinging on the fiber optic end face 120 of a fiber optic male connector, i.e., plug, 113.

The spacing of the dispensing nozzle 104 from the fiber end face during cleaning enables the concentrated cleaning jet column 118 to clean and dry a fiber optic end face that is recessed (a female connector) in an adapter housing 122 (FIG. 10). The same cleaning nozzle is also capable of cleaning end faces that are not installed in an adapter, i.e., a fiber optic male connector 113 having a fiber end face 120 (FIG. 9). Specifically, FIG. 9 shows a fiber optic male connector 113 having a fiber optic end face 120 being cleaned by jet column 118 with no physical contact between cleaning device 100 and connector 113. As shown in FIG. 10, the concentrated jet column 118 may also be directed through the open end of an adapter housing 122 and onto a fiber optic end face 124 that is installed in the recessed confines of the adapter housing. An alignment sleeve 115 within adapter housing 122 receives a male connector 113. There is no physical contact required with the end face 124 regardless of where the end face is located, nor is there need for insertion of the cleaning device 100 or any part thereof into the adapter housing 122. A fixture that contacts the adapter housing and supports the cleaning device may be used to maintain precise positioning of the cleaning device relative to the adapter housing during the cleaning cycle.

The Coandă effect can be induced in both gases, e.g., air, and liquids. Therefore, a high-purity, fast-drying solvent cleaner may be injected momentarily into the existing airstream column. This is done by opening the movable needle plug 110 to introduce solvent from a source of solvent 116 through line 119 and out inner solvent orifice 108*a*. The area of low pressure which forms jet column 118 (FIGS. 8, 9 and 10) is created by the Coandă effect and causes the solvent to instantly atomize into a high velocity mist of droplets within the jet column 118. The airstream and atomized solvent droplets combine to create the high velocity jet column 118 containing an atomized mist that creates mechanical fluid cleaning action that may be directed onto a fiber optic end face for non-contact cleaning. When the solvent flow is shut off by moving needle plug 110 to its closed position (leftwardly as viewed in FIGS. 8, 9 and 10) the jet column 118 is dry and serves to cause residual solvent to evaporate. Evaporation of the solvent is facilitated by the reduced pressure within jet column 118 caused by the Coandă effect and obviates the need to apply a vacuum to remove residual solvent as is required by many prior art devices.

The cleaning device dispensing nozzle 104 of FIGS. 8-10 is one embodiment of a nozzle of the present invention which, when properly spaced from the fiber optic end face, will create the desired Coandă effect stream by properly combining the pressurized gas and solvent streams. Variations in the illustrated dispensing nozzle design may be made which will also provide a similar Coandă effect.

Tests using a Coandă induced low pressure airstream column have demonstrated superior cleaning of microscopic sized dust, oil, or combined dust and oil residues across the entire area of the fiber optic end face using a 5 to 10 second duration cleaning process, as follows.

Example 1 a.) The dispensing nozzle is positioned between 0.25 inch and 0.75 inch (0.6335 cm to 1.905 cm) from the fiber optic end face with the center of the air/solvent cleaning jet targeted at the apex (or center) of the polished fiber optic end face. Because the ferrule diameter of an end face may be as small as 1.25 millimeters ("mm") and the end face may also be recessed in an adapter housing, the nozzle is mounted to maintain proper targeting of the cleaning jet with no or minimum movement of the nozzle and cleaning jet during the cleaning cycle.

b.) The cleaning process is initiated with a one second ramp-up of compressed air flow dispensed from the nozzle to establish Coandă effect low pressure airflow off the tip of the symmetrical shaped movable needle, ensuring a constant concentrated airflow jet of high pressure air.

c.) By moving the needle to an open position, a 1-2 second timed injection of solvent off the tip of the symmetrical shaped needle and into the low pressure area established by the Coandă effect airflow is attained. The low pressure causes the solvent to immediately atomize into a high velocity mist of tiny droplets within the concentrated airflow column. The total amount of solvent dispensed in the 1-2 second timed injection is approximately 24 to 55 microliters.

d.) After 1-2 seconds, the injection of solvent into the airflow is stopped by moving the needle to a closed position while the concentrated airflow column is continued for a final 3-5 seconds exposing the end face and surrounding area to high velocity Coandă effect airflow to quickly volatize the atomized solvent that was dispensed and dry the end face and surrounding areas.

Example 2

In order to reduce the cleaning cycle time, testing has demonstrated that the following timing cycles provide effective cleaning while reducing the overall cleaning cycle time by 1 second. The cleaning process is as follows.

a.) Position the dispensing nozzle (such as nozzle 104 in FIGS. 8, 9 and 10) so that when the cleaning cycle begins, the jet flow emanating from the nozzle orifices is directed onto a connector end face.

b.) Start the flow of compressed air and simultaneously move the needle plug to an open position to dispense solvent from the nozzle to establish a Coandă effect airflow of high pressure air injected with solvent off the tip of the symmetrical shaped movable needle. The solvent is atomized instantly within the concentrated airflow into a high velocity mist of tiny droplets by the low pressure area established by the Coandă effect airflow.

c.) After 1 second, the needle plug is moved to the closed position stopping the flow of solvent into the airstream. The total amount of solvent dispensed in the 1 second timed injection is approximately 10-20 microliters.

d.) With the needle in the closed position, the concentrated high pressure airflow continues for an additional 2.5 seconds exposing the end face and surrounding area to high velocity Coandă effect airflow to quickly volatize the atomized solvent and dry the end face and surrounding areas.

e.) The cleaning cycle is completed after 3.5 seconds.

Although any compressed gas such as nitrogen or carbon dioxide would work in this application, the cleaning tests described in Examples 1 and 2 used filtered, dry compressed air generated by a small, portable compressor delivering air at a pressure of 17 PSIG and an airflow volume of 8.5 liters per minute.

The compressed air supply specifications exemplified herein show one way to achieve an ideal Coandă effect cleaning process. The properties of Coandă effect airflows are manipulated by surface condition and geometry of the dispensing nozzle and needle, and also by changes in air-pressure and air flow volumes. It should be understood that other nozzle designs, air pressures and airflow volumes may be used and adjusted as needed to obtain the Coandă effect.

The high purity solvent used in this cleaning method is selected to have a fast drying rate for all components. A suitable formulation is as follows, the amount of each component present being shown as percent by weight ("wt %") of the total weight of the solvent.

Example 3

60 wt %—1,1,1,3,3,3-Hexafluoro-2-methoxypropane (CAS 13171-18-1)
34.9 wt %—1-Chloro-2,3,3-trifluoroprop-1-ene (CAS 1263679-68-0 and 1263679-71-5)
05.0 wt %—Acetone CAS 67-64-1
00.1 wt %—Nitromethane CAS 75-52-5
Boiling Point: 52° C. (126° F.)
NVR: <10 ppm
Moisture content: <100 ppm
Vapor Pressure (Calculated): 33.7 kPa
Specific Gravity: 1.33 g/ml
Flammability: Not flammable per ASTM-D56 Closed Cup Flash Point test The above solvent formula was used in the testing described herein. However, alternate chemistries with similar physical properties would also produce similar results when using the Coandă effect cleaning process.

The solvent has electrostatic dissipative properties which eliminates existing end face triboelectric charges, or the buildup of electrostatic charges that may be created by pressurized airflow containing dust particulate removed during cleaning. Using the ACL Staticide Electrostatic Locator meter, model 300B, it has been demonstrated that a surface charged with 4,000-5,000 volts prior to cleaning is reduced to zero volts at the completion of the above-described cleaning cycle.

Because the cleaning method of the present invention does not involve any wiping or rubbing contact with an end face, no triboelectric charge is developed on the fiber optic end face by the cleaning. Further, using a solvent having electrostatic dissipative properties helps to avoid a triboelectric charge developing for other reasons because the solvate dissipates such charges. The cleaning process of the present invention thus eliminates triboelectric charges that may already exist on the plug, the end face, and associated connector components. A triboelectric charge can be generated by movement of the plug assembly during insertion and withdrawal of the plug from an adapter housing for inspection or by cleaning. By eliminating the static charges across the entire end face and immediate associated areas, this cleaning process eliminates the potential for electrostatic induced migration of dust particles after the connector plugs are mated.

Because the dispensing nozzle is positioned 0.25 inch to 0.75 inch (0.635 cm to 1.905 cm) away from the fiber end face (FIG. 10), the nozzle does not have to be custom sized to mate with a specific end face size. This means that one size cleaning nozzle can clean a wide range of connector sizes from 1.25 mm to 2.5 mm and other connector forms and sizes commonly used. It is to be noted that the specified distance from the outlet nozzle to an end face is measured from the tip of the needle plug 110 to the end face, as shown by the dimension d in FIGS. 8, 9 and 10.

Because the cleaning nozzle is spaced from the fiber end face during cleaning, the cleaning process of the present invention cleans 100% of an end face regardless of polishing, curvature or end face geometry. This 100% cleaning prevents the presence of contamination on outer areas of the end face diameter that may pass inspection scope software metrics but subsequently obstruct signal by migrating to the apex of two butted fibers mated in an adapter.

For male and female connectors, microscopic amounts of end face contamination are carried by the concentrated cleaning jet column off the end face and away from the connector; it is either harmlessly whisked away carried by airflow and/or volatilized as the solvent evaporates during the drying phase of the cleaning cycle.

The amount of atomized solvent droplets dispensed in the slower cleaning cycle of Example 1 totals 24 to 55 microliters, and in the faster cleaning cycle of Example 2 uses only 10 microliters. These small amounts of solvent used in the cleaning process are quickly volatilized as part of the drying process; there is no liquid present on adjacent surfaces to weep back onto the end face after cleaning. Also, there is no solvent leakage from the cleaned end face adapter to adjacent connectors, to other adapter housings, or to communications/electronic equipment located near the connector adapter assembly. The plug and end face is dry, clean, and ready to go into immediate service after cleaning.

The industry's more widely used contact cleaning devices are often referred to in the industry as "clickers" as explained above. Using such prior art clickers as a baseline for comparing cleaning performance, the following Example 4 demonstrates results of cleaning trials comparing the results of Coandă effect cleaning with baseline "clicker" cleaning outcomes. The cleaning test results tabulated below were performed on a 1.25 mm, LC ("Lucent Connector")

type connector, which because of its small end face diameter is considered the most difficult connector to clean. Lucent Connector is the fiber industry designation for the 1.25 mm connector which was first developed by Lucent Technologies.

Example 4

Because the industry lacks a standardized cleaning test method, the tests documented below were performed under controlled laboratory conditions using methodology created by the MicroCare Critical Cleaning Laboratory, New Britain, Connecticut, a laboratory maintained by an associated company of the Applicant. Inspection for cleaning outcomes was performed using a Viavi, FVDi-2080 inspection microscope with an FMA-LC adapter fitting. Results were determined using Viavi FiberChekPRO Software programmed per IEC-61300-3-35, Ed 2.0; Pass/Fail for single mode Fiber Ultra Polished Connectors (SM UPC).
Test Methodology.
1. Clean, inspect and confirm subject 1.25 LC end face is perfectly clean both visually and using inspection scope software confirming end face "Pass" outcome with no contamination or scratches present.
2. Contaminate the known clean 1.25 LC end face with either Arizona Road Dust to replicate particulate contamination, or with Artificial Sebum to replicate human skin oil formulated per ASTM D4265-14. Methods for the application of contamination were developed to provide consistent application of each contamination type for each end face test to minimize variables in terms of amount and density of contamination on an end face prior to cleaning trial.
3. Cleaning methods tested:
    a. STICKLERS® brand CLEANCLICKER® #MCC-CCU125, one full actuation per each cleaning attempt.
    b. IBC brand cleaner H125 #12910, one full actuation per each cleaning attempt.
    c. Coandă effect, one 6 second cycle per each cleaning attempt, fiber optic end face fixtured on center of dispensing nozzle (104 in FIG. 9), 0.25 inch from cleaning nozzle. (The distance d in FIG. 9 is 0.25 inch.) It should be noted that cleaning results obtained with the 3.5 second cleaning cycle described elsewhere herein were similar to those obtained in the six second cleaning cycle of this Example 4.
4. After first cleaning attempt, inspect with inspection scope software determining "Pass/Fail" outcome. If "Pass" on first attempt, no additional cleaning required. If "Fail", repeat cleaning on same end face and inspect with scope. No more than three (3) cleaning attempts total per each individual trial.
5. If cleaning result is "Fail" after three (3) attempts, this is factored into average cleans to pass column, and reason for failure noted.
6. For each software determined "Pass" outcome on an end face, a visual review of the inspection scope video display was performed to confirm under which of the following conditions the end face was "Passed" by the software:
    a. End face passed per software allowances but was not perfectly clean to the edge of the end face.
    b. End face showed scratches or another linear defect.
    c. End face passed per software and a visual review of video screen showed the end face was "perfectly clean" with no visible residue. Perfectly Clean denotes end face have contamination removed all the way to outer edge.
7. Perform each test trial 10 times per cleaning method, with results reported in Table 1.

TABLE 1

1.25 mm Male End Face Cleaning Data

| Contaminant | Cleaning Method | Average Number of Cleans to Pass | Passed per Software | Perfectly Clean | Scratches |
|---|---|---|---|---|---|
| Arizona Road Dust | MCC-CCU125 | 2.9 | Yes | No | Yes |
| Arizona Road Dust | IBC H125 | 3.1 | Yes | No | Yes |
| Arizona Road Dust | Coandă/22-53-3 Solvent | 1.1 | Yes | Yes | No |
| Artificial Sebum | MCC-CCU125 | 1.1 | Yes | No | No |
| Artificial Sebum | IBC H125 | 1.1 | Yes | No | No |
| Artificial Sebum | Coandă/22-53-3 Solvent | 1.8 | Yes | Yes | No |

Cleaning Results; Inspection Scope Images

Figures 1, 11:
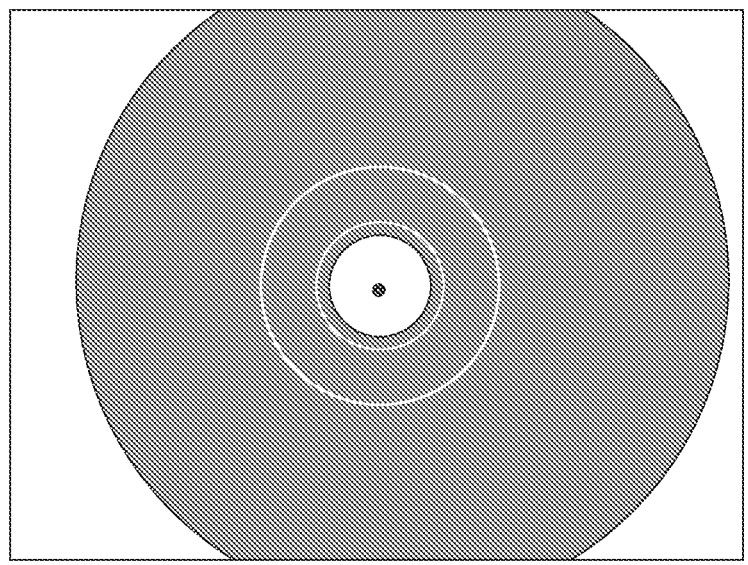
Figures 2A, 11:
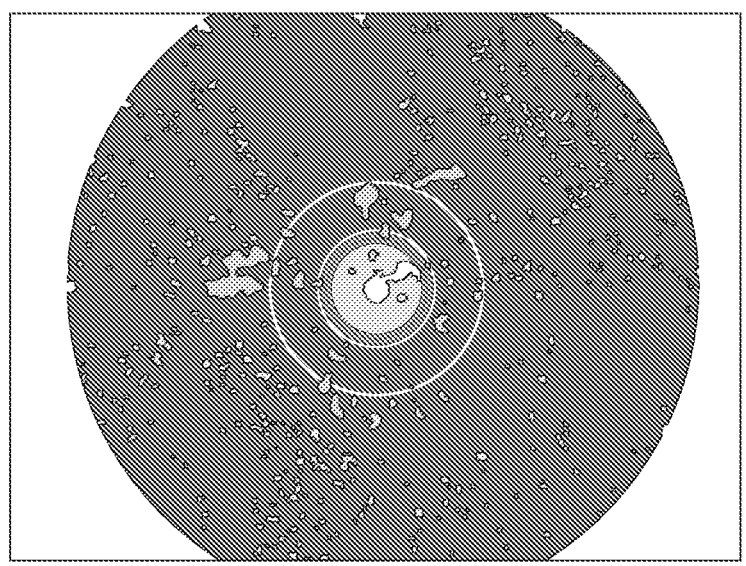
Figures 2B, 11:
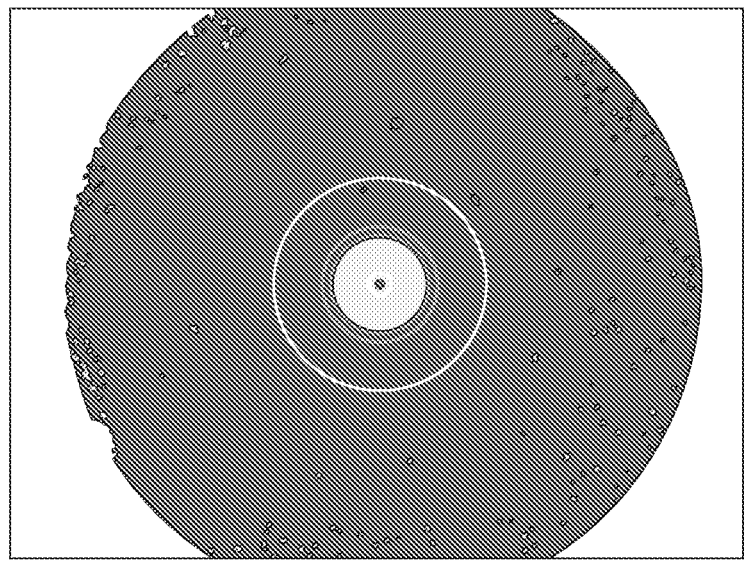
Figures 3A, 11:
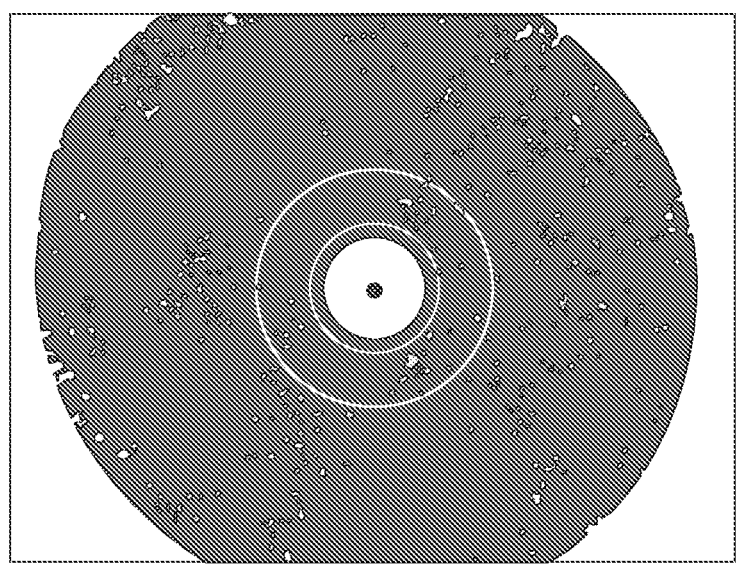
Figures 3B, 11:
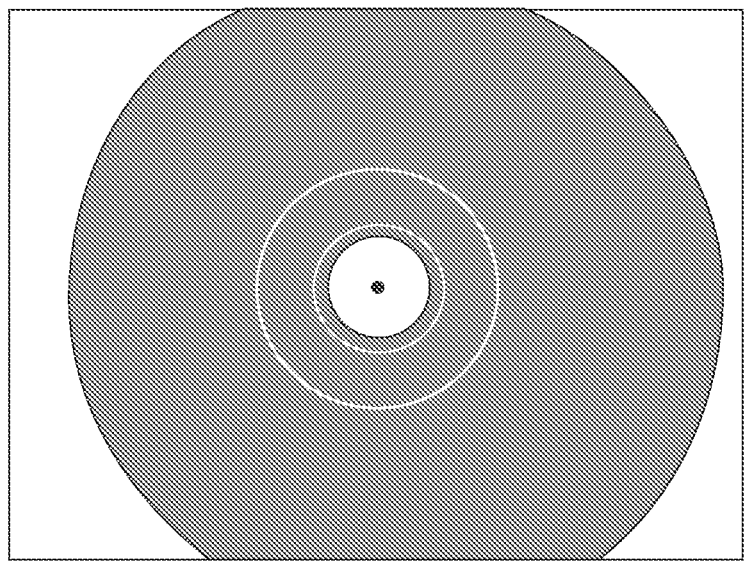
Figures 4A, 11:
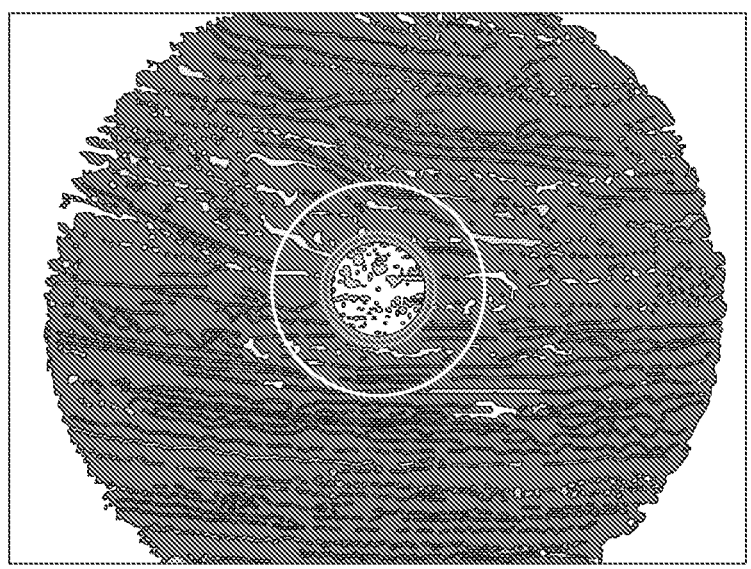
Figures 4B, 11:
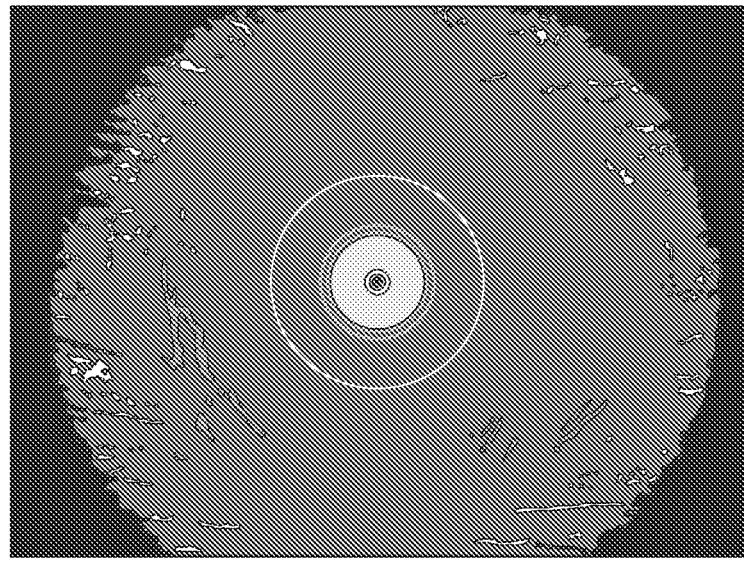
Figures 5A, 11:
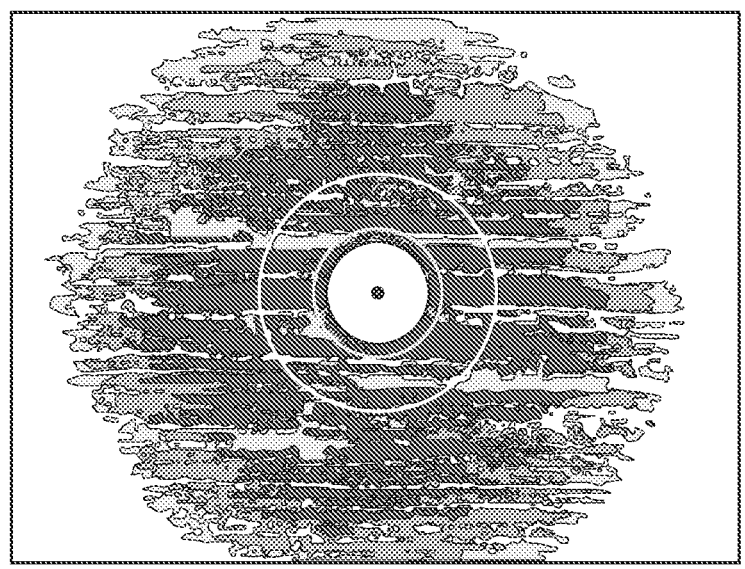
Figures 5B, 11:
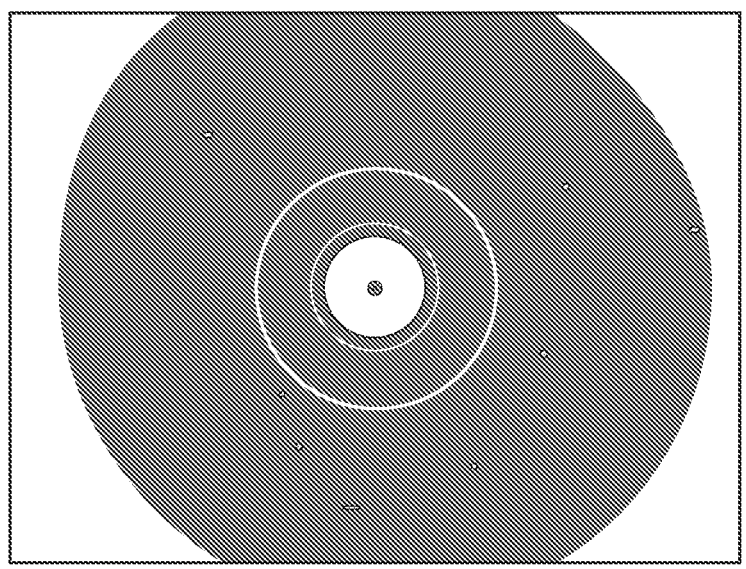

FIGS. 11-1 through 11-5B are ink drawings which reproduce photographs of 1.25 mm LC type connector end faces, magnified 80×. These end faces were cleaned and tested per the methodology detailed above.
FIG. 11-1
Clean end face, no contamination or defect. This is ideal end face condition for connector cleanliness prior to making a butted interconnect in an adapter housing. This is the condition of each connector prior to each cleaning trial detailed above.
FIG. 11-2A
End face with Arizona Road Dust prior to cleaning with CCU125 clicker.
FIG. 11-2B
End face with Arizona Road Dust after cleaning with CCU125. Passed per inspection scope software. Note apex (center) of end face is clean, but presence and concentration of particulate increases in areas farthest away from the apex.
FIG. 11-3A
End face with Arizona Road Dust prior to cleaning with Coandă Effect.
FIG. 11-3B
End face with Arizona Road Dust after cleaning with Coandă Effect. Passed per inspection software with no remaining dust contamination. Perfectly clean.
FIG. 11-4A
End face with Sebum oil prior to cleaning with CCU125 clicker.
FIG. 11-4B
End face with Sebum oil after cleaning with CCU125 clicker. Passed per inspection software, but only apex area of connector is cleaned. Outer edges of connector remain uncleaned because convex curvature of end face prevents full contact with clicker cleaning tip.
FIG. 11-5A
End face with Sebum oil prior to cleaning with Coandă Effect.

FIG. 11-5B

End face with Sebum oil after to cleaning with Coandă Effect. Passed per inspection software and entire end face is cleaned to outer edges on end face.

Example 5

A particularly useful solvent has the following composition. 83 wt % HFE-7100: hydrofluoroether comprising:
- 55 to 90 wt % Isobutyl Isomer: CAS #163702-08-7, methyl nonafluoroisobutyl ether
- 10 to 45 wt % Butyl Isomer: CAS #163702-07-6, methyl nonafluorobutyl ether 10 wt % Asahi AS300 hydrofluoroether comprising:
- 90 wt % Z-isomer: CAS #1263679-68-0
- 10 wt % E-isomer: CAS #1263679-71-5
- 7 wt % Heptane: CAS #142-82-5

Physical properties of this solvent are as follows.

Boiling Point: 56° C. (132° F.); recorded during a fractional distillation. Boiling point is indicative of how fast a fluid will dry.

Non-volatile residue ("NVR"): less than 10 ppm, collected via ASTM D2109.

This is important because the solvent needs to be consistently high in purity, because the contamination we are removing is microscopic. If there is higher than 10 PPM NVR, there is a risk of adding microscopic contamination to the area being cleaned.

Moisture content less than 100 ppm; collected with a Karl Fischer titrator via ASTM D3401.

Vapor Pressure (Calculated): 24.7 kPa. (The vapor pressure was calculated using the molar fractions and the vapor pressures of the three components at 25° C.)

Tests show that the ideal vapor pressure is about 24.7 kPa, e.g., about 25 kPa. This plays a role in how fast the solvent evaporates.

If the vapor pressure of the cleaning fluid is lower than about 25 kPa by more than 20%, the fluid is slower to evaporate, meaning drying times after cleaning will be too long.

Slow drying solvent will migrate back onto the end face after cleaning, possibly carrying contamination back onto the end face.

Slow drying solvent may also migrate onto connectors immediately adjacent to the connector being cleaned. This is a risk when connectors are densely mounted in racks and in immediate proximity to other connectors.

If the vapor pressure is more than 20% higher than about 25 kPa, this results in a solvent that dries too fast, that is, a solvent that will evaporate too quickly while in the high velocity Coandă airstream, resulting in insufficient amounts of solvent to properly clean the connector end face.

Specific Gravity: 1.39 g/ml; measured at 25° C. with a hydrometer. The 1.39 is relative to water.

Having a higher specific gravity makes a solvent more dense and capable of floating microscopic contamination off of a surface through buoyancy. For example, Oak wood (which is a relatively dense wood) has a specific gravity of 0.75, meaning oak dust/particles and similar construction dust would readily float in this solvent. In the short time and small amounts of solvent used to clean even smaller amounts of microscopic contamination on an end face, the relatively heavy solvent is beneficial for cleaning.

The above attributes are useful for solvents used in the practice of the present invention.

Example 6

A test was run to demonstrate the impact Coandă effect airflow has on solvent drying time. A steady-state air supply delivered clean, dry, airflow through a dispensing device positioned vertically above the center of the basin of the test fixture described below. Two different dispensing devices were alternately employed to deliver the air flow at the same pressure and velocity to dry 10 microliters of solvent. The only difference in the two methods of delivering air flow was that in one set of tests the air was flowed onto the solvent directly from the orifice of a conventional syringe cannula and in another set of tests the air was flowed onto the solvent from an orifice that incorporated a needle valve to establish Coandă effect airflow. The needle was positioned in the orifice as shown in FIGS. 8, 9 and 10 but only dry air was flowed.

Test Details

The test used a fixture to vertically position the air delivery device 0.250 inch (0.635 cm) above a basin-like depression centered in the bottom of a shallow cylindrical cup having an outside diameter of 0.585 inch (1.486 cm), an inside diameter of 0.511 inch (1.298 cm) to provide a circumferential wall 0.074 inch (0.188 cm) in thickness and 0.197 inch (0.500 cm) in height. The basin formed in the bottom of the cup had an outside diameter of 0.289 inch (0.734 cm) and a depth of 0.028 inch (0.071 cm). The basin then had 10 microliters ("μL") of the solvent of Example 5 placed in it using the Fisherbrand precision dosing single syringe described below.

The following equipment was used in the solvent evaporation tests. To deliver airflow for drying solvent in the basin, we used a syringe having a conventional circular cannula for the non-Coandă airflow, and a conventional artist's air brush for having a needle valve arranged in a manner as shown in FIGS. 8, 9 and 10, to provide Coandă airflow. To mitigate as many variables as possible, the syringe cannula orifice (for airflow) was sized to be as close as possible in size to the airflow orifice in the air brush. The syringe orifice diameter was 0.0095 in$^2$ and the air brush orifice diameter was 0.0041 in$^2$. The larger diameter of the conventional cannula gave it something of an advantage over the air brush. The air velocity dispensed from the syringe was controlled to match the air velocity coming out of the air brush, at 4.5 meters per second ("m/s").

The meter used to confirm airflow was an Air Science-Air Velocity Control Meter. The device used to dispense 10 microliters of solvent was a Fisherbrand Single Syringe Pump Model 78-0100L. Ambient temperature at test time was 65° F. (18.3° C.) on one day of testing and 73° F. (23.9° C.) on the other day of testing so that evaporation times were lower on the warmer day, but the relative evaporation rates were the same on both days.

A precise dose of 10 μL of solvent was deposited into the basin, then the compressor was turned on, blowing air through the delivery devices directly onto the solvent perpendicularly to the surface of the solvent. Total time to dry (evaporation of all 10 μL of solvent) was an average of times measured for both methods over at least 20 test cycles for both the syringe and the air brush. The results are as follows:

TABLE 2

| Air Delivery Mechanism | Utilizing Coandă? | Air Velocity (m/s) | Distance From Basin (in) | Distance From Basin (cm) | Solvent Volume (μL) | Number of Tests Run | Average Dry Time (seconds) |
|---|---|---|---|---|---|---|---|
| Air brush | Yes | 4.5 | 0.25 | 0.635 | 10 | 20 | 4.8 |
| Syringe | No | 4.5 | 0.25 | 0.635 | 10 | 24 | 7.6 |

Overall, the time difference is notable. Table 2 above shows that the Coandă effect airstream dried the 10 μL of solvent in the basin about 3 seconds faster on average than the air from the syringe, a rate about 37% faster than the non-Coandă effect airflow. This test demonstrates that the Coandă effect airflow establishes conditions (both directed airflow and low pressure zones) that significantly enhance the drying time of the solvent.

In accordance with the present invention, the solvent is atomized in the airflow by the Coandă effect, which further speeds the drying time compared to using a slug of unatomized solvent. The Coandă effect plays an essential role in achieving a cleaning cycle that in practice is only about 3.5 seconds in total duration. The cleaning cycle comprises about one second of delivery of compressed air (or other suitable gas) followed by shutting off the solvent flow in order to provide about 2.5 seconds of dry air or other gas. A short cleaning cycle time is very significant. Optic fiber cable connectors may include many individual fiber optic end faces, for example, as many as eight hundred male connectors which are connected to eight hundred female connectors in a cabinet. Consequently, as many as sixteen hundred end faces have to be cleaned. Saving even a few seconds per end face provides a significant time savings.

The present invention has been described in detail with respect to specific embodiments thereof but these specific embodiments are not intended to be construed as limitations on the scope of the invention.

What is claimed is:

1. A method of cleaning an end face of an optical fiber with a cleaning device comprising a nozzle having a nozzle outlet, within which is disposed a needle plug of diminishing cross section in the direction of outward flow through the nozzle and terminating in a pointed tip facing outwardly of the nozzle, the method comprising:

flowing a compressed gas stream through the nozzle over the needle plug and through the nozzle outlet, the needle plug and nozzle outlet being configured to form an emitted gas jet exiting from the nozzle outlet, the emitted gas jet forming a zone of reduced pressure relative to ambient pressure, the zone of reduced pressure surrounding the emitted gas jet;

aligning the nozzle outlet with such end face and positioning the pointed tip of the needle plug from about 0.25 inch to about 0.75 inch (0.64 to 1.91 cm) from such end face;

introducing a liquid solvent upstream of the nozzle outlet into the compressed gas stream, whereby the solvent is atomized in the emitted gas jet, impinging the emitted gas jet containing atomized solvent onto such end face for a cleaning time period; and discontinuing introduction of the solvent into the compressed gas stream to produce a dry gas jet and impinging the resulting dry gas jet onto such end face for a drying time period to remove solvent by evaporation which is accelerated by the zone of reduced pressure.

2. The method of claim 1 wherein the cleaning time period is from about 0.5 to about 2 seconds and the drying time period is from about 1 to about 4 seconds.

3. The method of claim 1 or claim 2 wherein the liquid solvent has a vapor pressure at 25° C. and one atmosphere pressure of from about 20 to about 30 kPa, a Kauri Butanol value of from about 18 to about 44 and is non-flammable per ASTM D-56 Closed Cup Flash Point test.

4. The method of claim 1 or claim 2 wherein the liquid solvent introduced into the gas jet may comprise (a) 83 wt % hydrofluoroether comprising: 55 to 90 wt % methyl nonafluoroisobutyl ether, and 10 to 45 wt % methyl nonafluorobutyl ether;

(b) 10 wt % hydrofluoroether comprising: 90 wt % Z-isomer, and 10 wt % E-isomer; and (c) 7 wt % heptane, the solvent containing less than 10 ppm non-volatile residue and less than 100 ppm moisture.

5. The method of claim 1 or claim 2 wherein the liquid solvent introduced into the gas jet comprises 60 wt % 1,1,1,3,3,3-hexafluoro-2-methoxypropane, 34.9 wt % 1-chloro-2,3,3-trifluoroprop-1-ene, 5.0 wt % acetone, and 0.10 wt % nitromethane, the solvent containing less than 10 ppm non-volatile residue and less than 100 ppm moisture.

6. The method of claim 1 or claim 2 wherein the nozzle outlet comprises a gas outlet and a separate solvent outlet and the needle plug is disposed within the solvent outlet, the method further comprising moving the needle plug between an open position which opens the solvent outlet to dispense solvent into the compressed gas stream and a closed position which stops the dispensing of solvent into the compressed gas stream, and moving the needle plug into the open position to initiate the cleaning time period and moving the needle plug into the closed position to terminate the cleaning time period and initiate the drying time period.

7. The method of claim 1 or claim 2 wherein the compressed gas is selected from the group consisting of air, nitrogen and carbon dioxide.

8. The method of claim 1 or claim 2 wherein the velocity of the emitted gas jet flowing over the needle plug is sufficient to cause a Coandă effect to generate the zone of reduced pressure.

* * * * *